March 3, 1931.    L. R. MacKENZIE    1,795,226
METHOD OF MAKING BITUMINOUS EMULSIONS
Filed Oct. 30, 1930
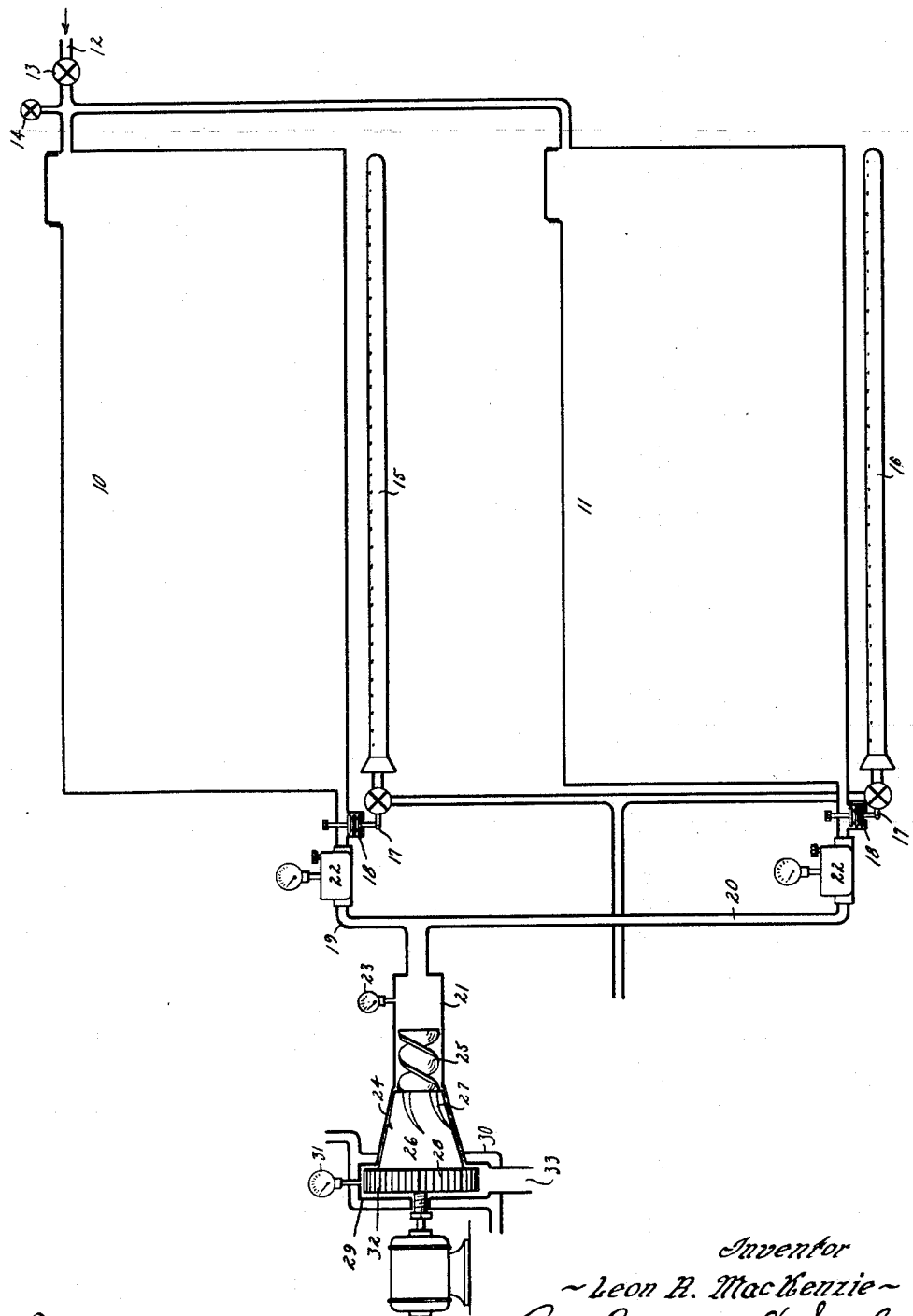
Inventor
~Leon R. MacKenzie~
by Bair, Freeman & Sinclair
Attorneys
Witness
H. S. Menzenmair Patented Mar. 3, 1931

1,795,226

UNITED STATES PATENT OFFICE

LEON R. MacKENZIE, OF DES MOINES, IOWA

METHOD OF MAKING BITUMINOUS EMULSIONS

Application filed October 30, 1930. Serial No. 492,169.

My invention has to do with a method for making a liqueous emulsion of a bituminous substance, such as asphalt, which will be sufficiently stable so that it can be handled, stored and used under ordinary and proper conditions, and still will break down from the emulsion form in the necessary time after the emulsion has been finally placed and spread into thin films.

Generally speaking, bituminous emulsions will fall into two general classes; those in which water and soap, or allied substances, are use as the emulsifying agent, and those in which water and other substances having colloidal characteristics are used as the emulsifying agent. This discussion will cover mainly the first named class of emulsions, but it should be understood that with appropriate changes in certain steps of the process the second named class of emulsions can be readily and economically produced by this process.

In addition to the fact that various kinds and forms of emulsions may be made according to this process, one of the very great advantages is the fact that the bitumen may be of any desired hardness or ductility and the emulsion may be made with any reasonable and practical relative volumes of bitumen and emulsifying agent. So far as I am able to determine, it is possible, with the use of this process, to make any known form of bituminous emulsion, besides which it is possible with this process to combine certain characters and certain relative volumes of material which it has not been heretofore considered possible to emulsify and keep the emulsion in a stable condition for the length of time required from the standpoint of practical and economical results. A further advantage of this process is speed and economy of production which has been hitherto unknown, so far as I am able to determine. I will now proceed to a detailed description of the process and its steps, with a further description of the advantages and economies as they may be evidenced by or related to the various steps of the process.

The first step is the selection of the particular bitumen which it is desired to emulsify.

The next step is the determination of the desired character and concentration of the water and emulsifying agent (hereinafter called emulsifier) and water. Using known emulsifying agents, their character and/or concentration may be varied within considerable range according to the nature of the asphalt and/or agents used, the character of the emulsion desired, for instance, whether it should be quick or slow breaking, adhesive or non-adhesive, etc. and the nature of the aggregate or other material with which the emulsion may be ultimately used.

There are, of course, certain limits as to the character and concentration of the emulsifying agent and as to the relative volumes and so forth, beyond which it is impossible to go, but I have been able to make stable and satisfactory emulsions with bitumens of any penetration and ductility, with various emulsifying agents, in concentrations of any desired amounts, from one-half percent to six percent, containing any desired amount of bitumen from forty-five percent to seventy percent. However I do not wish to be limited in any of these respects to anything other than the utmost limits consistent with commercial, practical and economical results. The versatility of this process in the above-mentioned respects is a very great advantage, which, so far as my knowledge goes, is not present in any other emulsifying process.

Having selected the bitumen and emulsifying agent and determined the concentration of the emulsifying agent and water, and the desired relative volume of bitumen in the emulsion, the next step is the determination of the proper relative temperatures to which it is necessary to bring the bitumen and the emulsifying agent in order to effect an emulsion when they are combined.

The minimum temperature for the bitumen will be that at which it will flow readily. For instance, if gravity instead of pressure flow is utilized in the process, the minimum temperature required for bitumen of a standard penetration of 100 will be about 260 degrees Fahrenheit. In many cases it will be advisable and desirable to use higher than the minimum temperatures required. The maximum temperature practically possible will be that which will volatilize the bitumen, and the maximum practical temperature will be governed by the temperature required at the point of combining and the temperature possible to attain economically in the water and emulsifying agent.

The required or desired temperature at the point of combining the bitumen and the emulsifier will be determined largely by the softening point temperature of the bitumen, and to some extent by the pressure, if any, used in the process, as well as by the relative volumes of bitumen and emulsifier.

The usual range is somewhere from 190° F. to 220° F. The minimum possible temperature at the combining point in any case will be that at which the combined materials become too hard to flow readily. The maximum temperature possible will be that at which a large part, or all of the water, will be converted into steam. I intend to cover in my application all possible temperatures of combination under any condition of relative temperatures, volumes or pressures.

The required or desired temperature of the emulsifier will vary directly with the temperature of the bitumen, the percentage of bitumen in the emulsion and the required temperature at the point of combining the bitumen and water with the emulsifying agent and may be determined as follows:

Let
Tw equal temperature of emulsifier,
Te equal temperature at point of combining bitumen and emulsifier,
Pb equal percentage (volume) of bitumen in emulsion,
Tb equal temperature of bitumen,
Pw equal percentage (volume) of emulsifier.
Then $$TW = \frac{Te - (Pb \times Tb)}{Pw}$$

Thus for illustration, if it is desired to make an emulsion containing 50 percent of 100 penetration asphalt, requiring a temperature of 260° F., to reduce it to a proper liquid state, and the proper combining temperature desired for that combination is 212° F., substituting these assumed values in the above formula will show, that under these conditions the required temperature for the emulsifier would be 164° F.

It will be seen that it is possible to work out a wide range of relative temperatures within the range of proper combining temperatures and that a proper selection of temperatures is vital to the proper operation of the process. It will also be seen that there is a possibility of arbitrarily varying any two of the three temperatures at will, within the range of possible combining temperatures, but that when any two of these temperatures are arbitrarily determined the third temperature is necessarily automatically set. When pressure is used, all three temperatures can be raised above the normal temperatures, without pressure, in an amount corresponding to the ratio at which application of pressure raises the boiling point of water. I intend to cover in this application, each as a separate step in the process, all of the regulatory features of each one of these temperatures within the possible combining range, including adjustment of temperatures as pressure, if any, is used, because certain emulsions contemplated by this process will require special treatment in which the temperature relations will become abnormal as compared with the most efficient and favorable conditions under which to produce emulsions for the usual purpose and having the usual characteristics.

The next step in the process would be to place the bitumen in one container and the emulsifier in another. These containers should be such that heat can be applied. Under certain conditions, it will be advisable to have some means, mechanical or otherwise, to keep the emulsifier in a proper state of suspension. By the way of illustration, mechanical stirrers, steam or air jets or the like, may be employed for this purpose. If pressure is necessary or desired, the containers should also be such that pressure in addition to heat may be applied. The bitumen and the emulsifier should then be brought to their proper respective temperatures as hereinbefore outlined.

They should then be allowed to flow together either by gravity, or under pressure, into a mixing chamber. The relative volumes of bitumen and emulsifier through the flow lines must be carefully adjusted and controlled, since the temperatures and relative volumes determine both the proper combining temperature and the relative percentage of bitumen and emulsifier in the emulsion. This can easily be done for instance by means of theremometers, thermocouples, or other suitable devices placed in the container or the flow lines and by means of sensitive and accurate check valves in the flow lines from the containers to the mixing chamber. If desired, a fine screen or plate with small holes may be inserted in the end of each flow line, or in a common flow line after the bitumen and emulsifier have flowed together, to break down the stream of bitumen and/or emulsifier into fine particles as in a spraying action.

At the instant when the bitumen meets the emulsifier there is a foaming action which greatly increases the volume of the mixture and spreads the bitumen into thin films, forming a coarse or rough emulsion, with the bitumen as the external phase—in other words, drops of emulsifier surrounded by films of bitumen, constituting a primary emulsion. At this point, it is desirable to stretch the asphalt films and to break up these films into minute particles. These minute particles are then thoroughly dispersed and diffused through the emulsifier by suitable mechanical means, which will have a stretching, smoothing and mixing action in combination with forward movement. There is thus formed a coarse or rough emulsion with the bitumen as the internal phase,—or in other words, particles of bitumen surrounded by films of the emulsifier, constituting a secondary emulsion.

The next step in the process may be practised, for example, by passing this coarse or secondary emulsion through a close elongated aperture between two close surfaces, at least one of which is moving with respect to the other. These surfaces, which may or may not be serrated or otherwise deformed or roughened, act to stretch, grind and tear the particles of bitumen into still finer form and also act to increase the dispersion and diffusion of the bituminous particles through the emulsifier and thus form a tertiary emulsion. The space beween these surfaces should be such as to promote this stretching, grinding, tearing, diffusing and mixing action.

The fineness and uniformity of the finished product is controlled by both the spaces between surfaces and the speed of movement of the surfaces with respect to each other. It is advisable to have these surfaces slightly tapered from the front to the back, so that there is a constant decrease in the space between surfaces as the emulsion passes between them. Thus the proper determination and regulation at will of both the clearances between surfaces and the speed of movement, according to the necessary or desired fineness of the emulsion, are elements of the process and are regulatory steps which I intend to cover in this application.

Generally speaking, the finer the final emulsion the more stable the product will be,—yet the quicker the emulsion will break down when finally spread into thin films. This stability until finally spread and ability to break down quickly after spreading, is a highly desirable quality in the normal uses of a bituminous emulsion and is a property which has been apparently very difficult to secure in commercial emulsions. In the ordinary commercial emulsions now available, when the emulsions break down quickly after spreading, they also are very apt to separate out during handling and storage enmass, whether exposed to aeration or not. This condition can be remedied very easily by regulating the size of the aperture in this process, and/or the clearances between moving surfaces and the relative speed of the surfaces so as to secure very fine particles of bitumen thoroughly dispersed and diffused through the liquefier.

After forming the tertiary emulsion, it is advisable to introduce at this point a centrifugal action whereby the liqueous emulsion will be thrown by centrifugal force against a fixed or moving surface. This will accomplish a re-mixing action. Also by this operation the entrapped air would be released, which would render the emulsion more liquid. Thus the final emulsion would be formed. I intend to cover this centrifugal action as a process step, advisable under practically all conditions, but not essential in all cases. In addition to the foregoing, this centrifugal action would exert a pull on the emulsion stream, thus increasing flow. This centrifugal action would be easily accomplished by having the emulsion stream as it emerged from the close surfaces passed across a rotating or otherwise moving disc or plate, operating in a plane at an angle to the direction of movement of the emulsion stream. The fixed or moving surfaces could be the inside surfaces of the housing around the moving disc or plate.

In passing through the immediately preceding operations, the emulsified materials would naturally lose some of the original heat and would reach the centrifugal action at a temperature slightly lower than the combining temperature. It has been found advisable to carry on the centrifugal action at a temperature slightly lower than that required for an original combination. In most emulsions made by this process, the entrapped air will cause the emulsion to assume a semi-liquid form at normal temperatures. The minimum temperature for centrifugal action would be the lowest temperature at which the emulsion would still be in a completely liqueous state. By way of illustration, with various emulsions, these required temperatures have been found to range from 150° F. to 180° F., but under certain conditions this range may be exceeded, and I do not wish to be limited to anything other than the full practical range. If necessary to bring the emulsion to a temperature for proper centrifugal action, lower than the natural temperature, this can be accomplished by introducing at the centrifugal point a cooling apparatus, such as a water jacket or cooling fan.

In lieu of the centrifugal action, the tertiary emulsion can be conveyed, after it has emerged from the close moving surfaces, into a vat or container, applying a stirring action until the emulsion has liberated all of the entrapped air, thereby forming a final emulsion.

The centrifugal action is to be preferred in most cases, because it is more complete and faster therefore, more efficient and economical. In certain types of emulsions, it is advantageous to have the stirring vat or chamber contain some previously prepared emulsion into which the newly made emulsion can be thoroughly stirred and commingled.

After the emulsion thus made has passed the centrifugal or stirring operation, the emulsion is preferably rapidly cooled to normal temperature by any suitable means, to increase stability, after which it is ready to be stored or shipped. After the emulsion has reached this condition it is, and remains, more uniform and stable through any of the usual conditions of handling, shipping or storing, than any of the emulsions, of which I know, and will still break down from the emulsion form when spread into thin films in shorter time and under conditions which are most desirable from a standpoint of practical use.

Another great advantage of this process is the fact that it does not substantially alter the characteristics of the bitumen, unless the characteristics of the bitumen are deliberately changed.

Having described the process of making certain forms of bituminous emulsions, I will now proceed to the description of some auxiliary, co-related or alternative features, possible or advisable with this process.

One of these features is the use of pressure, which has been hitherto covered, as an advisable, but not necessarily an essential part of the process. The use of pressure behind the bitumen and emulsifier may be said to accomplish the following objects:

1. To insure a uniform and fast flow.
2. To force materials through a desired size of aperture.
3. To counteract expansion when the hotter bitumen meets the colder emulsifier.
4. To increase temperatures to secure increased fluidity.
5. To decrease percentage of emulsifier and fluidity of emulsion.

It is not absolutely essential to convert the primary coarse emulsion into a secondary emulsion prior to passing it through the elongated aperture, as it has been found possible to accomplish this as the first part or action of the succeeding operation. In this case the elongated aperture would be somewhat extended and the initial clearances or spacing would be somewhat greater.

The breaking up of the primary coarse emulsion and the diffusion and dispersion would thus be early accomplished and the following convergence of the relatively moving surfaces would then reduce the secondary emulsion into the tertiary form in exactly the same way as in the process described. I believe it to be advisable in practically all cases to reduce the primary coarse emulsion to the secondary form prior to introducing the emulsion into the elongated aperture, as the utilization of the stretching, smoothing and mixing action in combination with forward movement to accomplish this reduction to secondary form at the earliest possible stage secures very decided beneficial properties in the finished product.

A further advantage of this process lies in the fact that if for any reason, with special products or otherwise, it is necessary to induce any particular desired temperatures, slowly or suddenly, at any particular point, this can be done by placing at that point steam or hot air jackets for raising temperatures and water jackets or cooling fans for lowering temperatures. In this way every possible combination of emulsifiable materials could be effected under any desired conditions, since with this continuous operation there is nothing to prevent spreading out the various operations so that the temperatures at any point would not seriously interfere with the necessary temperatures at any other point. Relatively simple pumping apparatus could be used to convey the partly emulsified material from one process step to the other, or the liqueous stream could readily be sent through the entire process under sufficient pressure to cause it to flow continuously. As the flow throughout the process would be constant and as the relative volumes and temperatures would be constant in any given emulsion, it would be a very simple matter to adjust the flow of liquids, air or vapor through the jacketed portions of the apparatus to induce in the emulsified material any desired temperature at any given point.

For the purpose of illustrating my invention and making clearer the steps followed in the practice of it, I have provided herewith a drawing in which the figure illustrates diagrammatically one form of mechanism with which my method may be used.

In the drawing herewith, I have used the reference numeral 10 to indicate a container for bitumen and the reference numeral 11 to indicate a container for an emulsifier. Pressure may be provided through a pipe 12 from any suitable source. The pressure may be regulated by means of a valve 13. Pressure may be relieved by means of the valve 14.

For maintaining the bitumen and the emulsifier at proper temperatures, I have provided the heaters 15 and 16. I have shown at 17 automatic controls for these temperature maintaining devices. It will, of course, be understood that manual controls could be employed. The automatic controls may include thermostats 18 which are preferably adjustable and are sensitive to the temperatures of the bitumen and emulsifier.

The contents of the containers 10 and 11 may be taken through pipes 19 and 20 to the mixing chamber 21 in which the primary coarse emulsion is formed. Flow meters 22 control the flow through the pipes 19 and 20. 23 is a temperature indicator for showing the temperature of the combination when the ingredients flow together.

The mixing chamber 21 communicates with the interior of a housing 24 at one end thereof. Journaled in the housing 24 is a spiral screw 25, which advances the emulsion for mixing and smoothing and stretching and breaking up the bitumen films and dispersing and diffusing them through the emulsifier and forming a coarse emulsion with bitumen as the internal phase.

The emulsion is moved from the spiral screw 25 to the rotating member 26 which has substantially the form of a truncated cone as shown and is mounted within a portion of the housing of corresponding form.

The member 26 has the serrations 27 which may be substantially as shown or may vary in size and form and arrangement.

The emulsion enters at the smaller end of the cone-shaped portion of the housing 24 and travels along between the closely spaced faces of the housing and the member 26, which are slightly converging toward the larger end of the member 26.

In this passage, the emulsion is again subjected to tearing, stretching and grinding action which further diffuses and disperses the particles and reduces them to finer form, thus making a finer emulsion. The fineness of this emulsion may be regulated by the adjustment of the member 26 lengthwise and by controlling its speed of rotation. By the adjustment lengthwise, the clearance beween it and the interior face of the casing is controlled.

At the outer, larger end of the member 26 is an annular plate 28 of larger diameter than the larger end of the member 26 and preferably rotating on the shaft with it. The plate 28 travels in an enlarged portion 29 of the housing 24. The parts are so arranged that the fine emulsion strikes against the face of the plate and is then thrown out by a centrifugal action against the wall of the housing. This serves to further disperse the bitumen in the emulsion and to release the entrapped air and vapors. The temperature at the point of centrifugal action may be regulated as for instance by means of a water jacket 30 and suitable temperature controlling devices. The temperature indicator 31 is shown.

The periphery of the plate 28 is preferably serrated as shown at 32 to speed up the discharge of the product through the outlet 33.

No means for rapidly cooling the discharged emulsion is shown, but it is obvious that cooling means of various kinds could be readily provided.

It is of course obvious that my method may be practiced with other kinds of apparatus.

I claim as my invention:

1. The continuous method of making a bituminous emulsion comprising flowing molten bitumen and an emulsifier directly together at a combining temperature which is substantially at but slightly below the boiling point of the emulsifier, to form an emulsion with bitumen as the external phase, then immediately removing the emulsion from the zone of formation and agitating it to form an emulsion with bitumen as the internal phase, the relative volumes of the materials remaining constant.

2. The continuous method of making a bituminous emulsion comprising flowing molten bitumen and an emulsifier directly together at a combining temperature which is substantially at but slightly below the boiling point of the emulsifier, to form an emulsion with bitumen as the external phase, then immediately removing the emulsion from the zone of formation and agitating it to form an emulsion with bitumen as the internal phase, the relative volumes of the materials remaining constant, then subjecting the emulsion to centrifugal action.

3. The continuous method of making a bituminous emulsion comprising flowing molten bitumen and an emulsifier directly together at a combining temperature which is substantialy at but slightly below the boiling point of the emulsifier, to form an emulsion with bitumen as the external phase, then immediately removing the emulsion from the zone of formation and agitating it to form an emulsion with bitumen as the internal phase, the relative volumes of the materials remaining constant, and subjecting this secondary emulsion to grinding action between close converging surfaces having relative movement.

4. The continuous method of making a bituminous emulsion comprising flowing molten bitumen and an emulsifier directly together in proper relative volumes to form an emulsion with bitumen as the external phase, then immediately removing the emulsion from the zone of formation and agitating it to form an emulsion with bitumen as the internal phase, the relative volumes of the materials remaining constant, then subjecting the emulsion to centrifugal action and simultaneously cooling it.

5. The continuous method of making a bituminous emulsion comprising flowing molten bitumen and an emulsifier directly together in proper relative volumes to form an emulsion with bitumen as the external phase, then immediately removing the emulsion from the zone of formation and agitating it to form an emulsion with bitumen as the internal phase, the relative volumes of the materials remaining constance, then subjecting the emulsion to centrifugal action.

6. The continuous method of making a bituminous emulsion comprising flowing molten bitumen and an emulsifier directly together in proper relative volumes to form an emulsion with bitumen as the external phase, then immediately removing the emulsion from the zone of formation and agitating it to form an emulsion with bitumen as the internal phase, the relative volumes of the materials remaining constant, and subjecting this emulsion to grinding action between close converging surfaces having relative movement.

7. In a continuous method the steps of putting together molten bitumen and an emulsifier in proper relative volumes and at proper relative temperatures and treating them by mechanical action to form a bitumen internal phase emulsion and then subjecting this emulsion to centrifugal action for taking out air and increasing the dispersion.

8. In a continuous method the steps of putting together molten bitumen and an emulsifier in proper relative volumes and at proper relative temperatures and treating them by mechanical action to form a bitumen internal phase emulsion and then subjecting this emulsion to centrifugal action for taking out air and increasing the dispersion and simultaneously cooling the emulsion.

Des Moines, Iowa, October 27, 1930.

LEON R. MacKENZIE.